United States Patent
Bates et al.

(10) Patent No.: US 11,858,248 B2
(45) Date of Patent: Jan. 2, 2024

(54) THERMOPLASTIC SIMULATED TILE

(71) Applicant: Safety Tubs Company, LLC, Grand Prairie, TX (US)

(72) Inventors: Cory Bates, Arlington, TX (US); William Peck, Arlington, TX (US)

(73) Assignee: Safety Tubs Company, LLC., Grand Prairie, TX (US)

( * ) Notice: Subject to any disclaimer, the term of this patent is extended or adjusted under 35 U.S.C. 154(b) by 116 days.

(21) Appl. No.: 17/438,711

(22) PCT Filed: Mar. 12, 2020

(86) PCT No.: PCT/US2020/022253
§ 371 (c)(1),
(2) Date: Sep. 13, 2021

(87) PCT Pub. No.: WO2020/185997
PCT Pub. Date: Sep. 17, 2020

(65) Prior Publication Data
US 2022/0143952 A1  May 12, 2022

Related U.S. Application Data

(60) Provisional application No. 62/818,153, filed on Mar. 14, 2019.

(51) Int. Cl.
*B32B 27/08* (2006.01)
*B32B 7/023* (2019.01)
(Continued)

(52) U.S. Cl.
CPC .............. *B32B 7/023* (2019.01); *B29C 48/08* (2019.02); *B29C 48/21* (2019.02); *B32B 3/266* (2013.01);
(Continued)

(58) Field of Classification Search
CPC ..... B29C 48/08; B29C 48/21; B29K 2101/12; B29K 2995/002; B29L 2007/002; B29L 2009/00; B32B 13/00; B32B 2250/03; B32B 2250/04; B32B 2250/05; B32B 2250/24; B32B 2250/246;
(Continued)

(56) References Cited

U.S. PATENT DOCUMENTS 5,670,237 A  9/1997  Shultz et al.
6,387,504 B1  5/2002  Mushovic
(Continued)

OTHER PUBLICATIONS

International Search Report dated Jun. 24, 2020 in corresponding International Application No. PCT/US2020/022253 (2 pages).

*Primary Examiner* — Lawrence D Ferguson
(74) *Attorney, Agent, or Firm* — Tyler A. Stevenson; Anna-lisa L. Gallo

(57) ABSTRACT

A multilayer thermoplastic sheet, comprising a first colored thermoplastic layer; a second colored thermoplastic layer; and a third colored thermoplastic layer; wherein at least one of the colored layers is a different color than at least one of the other two colored layers; and a multilayer thermoplastic sheet, wherein the sheet has a total thickness of from about 0.125 inches to about 0.500 inches, and a plurality of lines cut into the surface at depth of from about 0.010 inches to about 0.080 inches. Lines may be cut into a multilayer thermoplastic sheet via computer numerical control (CNC) routing to simulate ceramic tile.

20 Claims, 1 Drawing Sheet

(51) Int. Cl.

| | |
|---|---|
| *B29C 48/08* | (2019.01) |
| *B29C 48/21* | (2019.01) |
| *B32B 3/26* | (2006.01) |
| *B32B 27/30* | (2006.01) |
| *E04F 15/02* | (2006.01) |
| *E04F 15/10* | (2006.01) |
| *E04F 15/16* | (2006.01) |
| *B29K 101/12* | (2006.01) |
| *B29L 7/00* | (2006.01) |
| *B29L 9/00* | (2006.01) |

(52) U.S. Cl.
CPC ............ *B32B 27/08* (2013.01); *B32B 27/302* (2013.01); *B32B 27/308* (2013.01); *E04F 15/02161* (2013.01); *E04F 15/105* (2013.01); *E04F 15/163* (2013.01); *B29K 2101/12* (2013.01); *B29K 2995/002* (2013.01); *B29L 2007/002* (2013.01); *B29L 2009/00* (2013.01); *B32B 2250/246* (2013.01); *B32B 2307/402* (2013.01); *B32B 2307/412* (2013.01); *B32B 2307/732* (2013.01); *B32B 2419/04* (2013.01)

(58) Field of Classification Search
CPC ...... B32B 2307/402; B32B 2307/4023; B32B 2307/4026; B32B 2307/406; B32B 2307/408; B32B 2307/412; B32B 2307/732; B32B 2419/04; B32B 27/08; B32B 27/302; B32B 27/308; B32B 27/32; B32B 27/34; B32B 27/36; B32B 3/266; B32B 3/30; B32B 7/023; E04F 15/02161; E04F 15/105; E04F 15/163
See application file for complete search history.

(56) References Cited

U.S. PATENT DOCUMENTS

| | | |
|---|---|---|
| 10,144,243 B2 | 12/2018 | Domanico |
| 2008/0115437 A1 | 5/2008 | Bordener |
| 2014/0331585 A1 | 11/2014 | Maax |
| 2015/0024166 A1 | 1/2015 | Maxx |

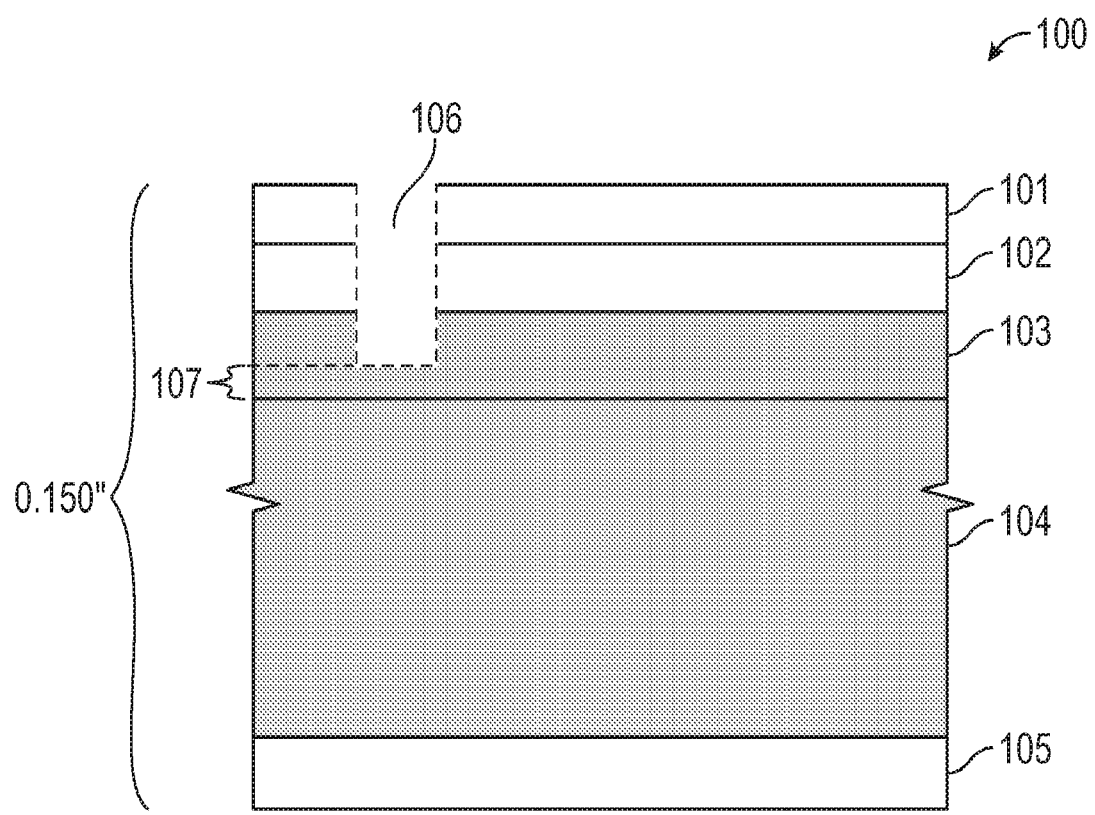

THERMOPLASTIC SIMULATED TILE

The disclosure is related to thermoplastic multilayer sheets which may comprise patterns to simulate tiles. The multilayer sheets are suitable for bathrooms, for instance bath or shower enclosures.

BACKGROUND

Bathrooms often employ ceramic tiles on walls, ceilings and/or floors to protect against the deleterious effects of moisture. An alternative to ceramic tiles are plastic sheets having grout lines embossed thereon or cut into to simulate a pattern of ceramic tiles. Such plastic sheets do not entirely capture the look of ceramic tile. Accordingly, desired are plastic sheets having patterns simulating ceramic tile that better capture the "look" of real ceramic tile and are more aesthetically pleasing.

SUMMARY OF THE INVENTION

Accordingly, disclosed is a multilayer thermoplastic sheet, comprising a first colored thermoplastic layer; a second colored thermoplastic layer; and a third colored thermoplastic layer; wherein at least one of the colored layers is a different color than at least one of the other two colored layers.

Also disclosed is a multilayer thermoplastic sheet, wherein the sheet has a total thickness of from about 0.125 inches to about 0.500 inches, and a plurality of lines cut into the surface at a depth of from about 0.010 inches to about 0.080 inches.

Also disclosed is a method of preparing a present multilayer thermoplastic sheet, the method comprising one or more co-extrusion or co-lamination processes.

Also disclosed is a method of cutting grout lines into a present multilayer thermoplastic sheet, the method comprising computer numerical control (CNC) routing.

BRIEF DESCRIPTION OF THE DRAWINGS

The disclosure described herein is illustrated by way of example and not by way of limitation in the accompanying FIGURES. For simplicity and clarity of illustration, features illustrated in the FIGURES are not necessarily drawn to scale. For example, the dimensions of some features may be exaggerated relative to other features for clarity. Further, where considered appropriate, reference labels have been repeated among the FIGURES to indicate corresponding or analogous elements.

FIG. 1 depicts a section of a composite multilayer sheet, according to an embodiment.

DETAILED DESCRIPTION

In an embodiment of the invention, the multilayer thermoplastic sheet comprises a first colored thermoplastic layer, a second colored thermoplastic layer, and a third colored thermoplastic layer, wherein at one of the colored layers is a different color than at least one of the other colored layers. A first colored layer will be towards the front or exposed side of the sheet and the third colored layer will be toward the back of the sheet.

A colored thermoplastic layer comprises one or more colorants, i.e. pigments and/or dyes. A colored thermoplastic layer has a visible color to an average person and is substantially non-transparent.

In some embodiments, the multilayer thermoplastic sheet may comprise four or more or five or more thermoplastic layers. The multilayer sheets are not limited in total layers, for instance they may comprise 6, 7, 8 or more thermoplastic layers. The multilayer sheets may comprise 3, 4, 5, 6, 7, 8 or more colored thermoplastic layers. The multilayer sheets may also comprise one or more clear or tinted thermoplastic layers. The term "tinted" meaning colored while still being transparent.

In some embodiments, the multilayer sheet may comprise a thermoplastic cap layer, which cap layer will be towards the front or exposed side of the sheet. In some embodiments, the multilayer sheet may comprise a thermoplastic base layer, which base layer will be towards the back of the sheet. In the absence of a cap layer, the first colored layer will be the first exposed layer upon installation of a sheet to a wall.

In some embodiments, a thermoplastic cap layer is clear, and may comprise essentially no colorants (pigments or dyes). The cap layer may serve to protect the under-layers. In some embodiments, the cap layer may provide a high gloss finish. In other embodiments, the cap layer may provide a matte finish. In other embodiments, a cap layer may comprise a small amount of colorant, for instance it may be tinted with a colorant. In other embodiments, a cap layer may be colored.

In some embodiments, the multilayer sheet may comprise a visible decorative design or pattern, for instance resembling a natural stone or wood grain look. In certain embodiments, a pattern may be printed on a thermoplastic film. The printed film may be laminated or extruded onto another layer. For example, a cap layer may have a pattern printed onto it, and the printed side laminated onto a multilayer sheet, thus providing a visible pattern. The pattern may be a random irregular pattern or may be a regular pattern.

A base thermoplastic layer will be in adherence to a wall upon installation of the sheet. In some embodiments, a base layer is clear and may comprise essentially no colorants. In other embodiments, a base layer may be tinted or may be colored. In some embodiments, a base layer aids adhesion of the sheet to a surface and provides resistance to chemical attack. In the absence of a base layer, the next bottom layer will be in adherence to a wall upon installation.

In some embodiments, the first, second and third colored layers may have a color chosen from white, grey and black. In some embodiments, the first colored layer has a different color than the second colored layer. In some embodiments, the second colored layer has a different color than the third colored layer. In other embodiments, the first colored layer may have a substantially identical color to that of the second colored layer. In other embodiments, the second colored layer may have a substantially identical color to the third colored layer.

Any color combinations are possible for the colored layers. In some embodiments, the first colored layer is white and the second and third colored layers are grey. In other embodiments, the first colored layer is white, the second colored layer is grey and the third colored layer is black. Additionally, any colored layer or combination of colored layers may comprise an "ombre" or gradient effect, wherein within a layer or series of layers, color gradually shifts from light to dark or from dark to light. An ombre effect will allow for a variety of color effects provided by different grout cut depths. Color may be defined according to CIE L*a*b* color space values.

In some embodiments, the multilayer thermoplastic sheet may be prepared by one or more co-extrusion or co-lamination processes. Thermoplastics may comprise one or more of polyolefins, styrenic polymers, acrylic polymers, polyesters and polyamides. In some embodiments, the thermoplastics comprise acrylic polymers and styrenic polymers. Acrylic polymers include polymethylmethacrylate (PMMA) and polybutylacrylate. Styrenic polymers include acrylonitrile-butadiene-styrene (ABS) terpolymer. In embodiments wherein one or more layers comprises a different thermoplastic than one or more other layers, the multilayer sheet may be considered a composite sheet.

In some embodiments, a total thickness of the thermoplastic multilayer sheet may be from any of about 0.080 inches, about 0.115 inches, about 0.120 inches, about 0.125 inches, about 0.130 inches, about 0.135 inches, or about 0.140 inches, to any of about 0.145 inches, about 0.150 inches, about 0.155 inches, about 0.160 inches, about 0.165 inches, about 0.170 inches, about 0.175 inches, about 0.180 inches, about 0.185 inches, about 0.190 inches, about 0.195 inches, about 0.210 inches, about 0.225 inches, about 0.250 inches, about 0.300 inches, about 0.350 inches, about 0.400 inches, about 0.450 inches, about 0.500 inches, or more.

In some embodiments, a cap layer thickness may be from any of about 2%, about 3% or about 4% to any of about 5%, about 6%, about 7% or about 8% or more of a multilayer sheet total thickness.

In some embodiments, a first colored layer thickness is from any of about 6%, about 7%, about 8% or about 9% to any of about 10%, about 11%, about 12%, about 13%, about 14%, about 15%, about 16%, about 17%, about 18% or more of a multilayer sheet total thickness.

In some embodiments, a second colored layer thickness is from any of about 7%, about 8%, about 9%, about 10%, about 11% or about 12% to any of about 13%, about 14%, about 15%, about 16%, about 17%, about 18%, about 19%, about 20%, about 21%, about 22%, about 23%, about 24%, about 25%, about 26%, or more of a multilayer sheet total thickness.

In some embodiments, a third colored layer thickness is from any of about 50% about 52%, about 54%, about 56%, about 58%, about 60%, about 62%, about 64%, about 66% or about 68% to any of about 70%, about 72%, about 74%, about 76%, about 78%, about 80%, about 82%, about 84% or about 86% or more of a multilayer sheet total thickness.

In some embodiments, a base layer thickness is from any of about 0.5%, about 1.0%, about 1.5% or about 2.0% to any of about 2.5%, about 3.0%, about 3.5% or about 4.0% or more of a multilayer sheet total thickness.

Layer thicknesses in total add up to 100% of the multilayer sheet total thickness.

In some embodiments, a width of the thermoplastic sheet is from any of about 12 inches, about 18 inches, about 24 inches, about 30 inches or about 36 inches to any of about 42 inches, about 48 inches, about 54 inches, about 60 inches, about 64 inches, about 68 inches, about 72 inches or more; and wherein a length of the sheet is from any of about 32 inches, about 38 inches, about 44 inches, about 50 inches or about 56 inches to any of about 62 inches, about 68 inches, about 74 inches, about 80 inches, about 86 inches, about 92 inches, about 96 inches, about 98 inches, or more.

Grout lines may be cut into or applied onto a multilayer thermoplastic sheet surface (front) via heat embossing or controlled routing, thus providing a plurality of lines to provide simulated ceramic tile. In other embodiments, grout lines may be cut with water or light (e.g. laser etching). In some embodiments, grout lines may be cut into a multilayer sheet with a CNC (computer numerical control) router. In some embodiments, grout lines may be cut into the sheet through the first colored layer and partially into the second colored layer. A part of the second colored layer may remain between the bottom of a grout line and the third colored layer. The cut lines may be intersecting lines. In other embodiments, cut lines may not intersect.

In some embodiments, a thickness of the second colored layer remaining in a grout line may be from any of about 0.002 inches, about 0.003 inches, about 0.004 inches, about 0.005 inches, about 0.006 inches, about 0.007 inches or about 0.008 inches to any of about 0.009 inches, about 0.010 inches, about 0.011 inches, about 0.012 inches, about 0.013 inches, about 0.014 inches, about 0.015 inches, about 0.016 inches, about 0.017 inches or about 0.018 inches or more. This represents a distance from the bottom of a grout line to the beginning of the next layer.

In some embodiments, grout lines may be cut into the sheet surface at a depth of from any of about 0.010 inches, about 0.013 inches, about 0.016 inches, about 0.020 inches, about 0.025 inches, about 0.030 inches, about 0.035 inches, about 0.040 inches or about 0.045 inches to any of about 0.050 inches, about 0.055 inches, about 0.060 inches, about 0.065 inches, about 0.070 inches, about 0.075 inches or about 0.080 inches or more.

In some embodiments, cut grout lines may have a width of from any of about 0.062 inches, about 0.070 inches, about 0.090 inches, about 0.100 inches, about 0.120 inches about 0.140 inches, about 0.160 inches, about 0.190 inches or about 0.210 inches to any of about 0.220 inches, about 0.240 inches, about 0.260 inches, about 0.280 inches, about 0.300 inches, about 0.310 inches, about 0.330 inches, about 0.350 inches, about 0.360 inches, about 0.375 inches or higher. A width of a cut grout line may be a measurement of a grout line width at a surface of a multilayer sheet. An average width of a cut grout line may be an average width of a random sampling of grout line widths at a surface of a multilayer sheet. A random sampling may include for instance 2 or more, 3 or more, 4 or more, or 5 or more measurements.

In some embodiments, a cut grout line may have an essentially symmetrical "rectangle" shape as displayed in FIG. 1. In other embodiments, the cut grout lines may have a "V shape" or a "U shape". Cut grout line shapes may be essentially symmetrical and regular, or alternatively, may have irregular shapes. Cut grout lines may have angled walls—as in a V shape. Cut grout line walls may be substantially parallel—or may not be parallel. In some embodiments, cut grout lines may have parallel walls and may have an essentially symmetrical "parallelogram" shape. In other embodiments, one wall may be angled and the opposing wall may be straight (perpendicular to the surface). In some embodiments, all layers of a multilayer sheet exposed in a cut grout line may be visible to a viewer when observed "straight on"—either both walls of a grout line or one wall.

Simulated grout lines may be embossed into, machined into or cut into a multilayer sheet to provide an appearance of ceramic tiles. A present arrangement of layers and colored layers provide for a more aesthetic appearance and a more "real" look of ceramic tile.

FIG. 1 depicts a section of multilayer composite sheet 100 according to one embodiment of the invention. In this embodiment, multilayer sheet 100 total thickness is about 0.150 inches. Grout line 106 is about 0.030 inches deep, extending through cap layer 101, through first colored layer 102 and partially into second colored layer 103. In this embodiment, cap layer 101 is about 0.0075 inches thick, first colored layer 102 is about 0.0150 inches thick, second colored layer 103 is about 0.0225 inches thick, third colored layer 104 is about 0.1020 inches thick, and base layer 105 is about 0.0030 inches thick. Also in this embodiment, third colored layer 104 comprises acrylonitrile-butadiene-styrene copolymer (ABS) while the remaining layers comprise polymethylmethacrylate (PMMA). Cap layer 101 and base layer 105 are clear and non-colored. First colored layer 102 is white and second 103 and third 104 colored layers are a substantially identical shade of grey. Portion 107 of second colored layer 103 remains after grout line 106 is cut, portion 107 being about 0.015 inches.

In an alternative embodiment, a total sheet thickness may be about 0.180 inches. A cap layer may be about 0.009 inches thick, a first colored white layer may be about 0.018 inches thick, a second colored grey layer may be about 0.027 inches thick, a third colored grey ABS layer may be about 0.122 inches thick, and a clear base layer may be about 0.004 inches thick. Grout lines may be cut at a depth of about 0.040 inches thick, through the first colored layer and partially into the second colored layer.

In yet another embodiment, a total sheet thickness may be about 0.165 inches. A cap layer may be about 0.008 inches thick, a first colored white layer may be about 0.017 inches thick, a second colored grey layer may be about 0.025 inches thick, a third colored grey ABS layer may be about 0.112 inches thick, and a clear base layer may be about 0.003 inches thick. Grout lines may be cut at a depth of about 0.033 inches thick, through the first colored layer and partially into the second colored layer.

In other aspects of the invention, disclosed is a multilayer thermoplastic sheet, wherein the sheet has a total thickness of from about 0.125 inches to about 0.500 inches, and a plurality of lines cut into the surface at depth of from about 0.010 inches to about 0.080 inches. In some embodiments, multilayer sheets may comprise one or more colored layers, wherein the color of any two layers may be the substantially the same or different. Such multilayer sheets provide a realistic ceramic tile look. Such multilayer sheets may provide the appearance of variable color effects within a grout line, even without having different color layers.

In some embodiments, these multilayer thermoplastic composite sheets may comprise a first colored thermoplastic layer and a second colored thermoplastic layer, wherein the plurality of cut lines extend partially into the first colored layer and a thickness of the first colored layer remaining in the lines is from about 0.002 inches to about 0.018 inches. A color of the first colored layer may be substantially the same or may be different than the color of the second colored layer. In some embodiments, colored layers comprise one or more colors chosen from white, grey and black. In other embodiments, one or both of these layers may be clear and/or tinted.

In some embodiments, these multilayer sheets may comprise three, or more thermoplastic layers, four or more thermoplastic layers, or five or more thermoplastic layers. In some embodiments, these multilayer sheets may comprise a thermoplastic cap layer and/or a thermoplastic base layer.

In some embodiments, these multilayer sheets may comprise one or more layers comprising an acrylic polymer and/or one or more layers comprising a styrenic polymer.

In some embodiments, these multilayer sheets may have a first colored layer having a thickness of from about 7% to about 26% of the sheet total thickness; and a second colored layer has a thickness of from about 74% to about 93% of the sheet total thickness. Thicknesses of other possible layers are as defined above. Other measures likewise may be as above.

The multilayer thermoplastic sheets are suitable for use in bathrooms, for instance in bath tub or shower enclosures and provide the appearance of ceramic tile.

In some embodiments, one or more of the thermoplastic layers may comprise glass fibers or one or more other fillers.

Following are some embodiments of the disclosure.

In a first embodiment, disclosed is a multilayer thermoplastic sheet, comprising a first colored thermoplastic layer; a second colored thermoplastic layer; and a third colored thermoplastic layer; wherein at least one of the colored layers is a different color than at least one of the other two colored layers.

In a second embodiment, disclosed is the multilayer thermoplastic sheet according to embodiment 1, comprising four or more thermoplastic layers. In a third embodiment, disclosed is the multilayer thermoplastic sheet according to embodiment 1, comprising five or more thermoplastic layers. In a fourth embodiment, disclosed is a multilayer thermoplastic sheet according to any of the preceding embodiments, comprising a cap layer. In a fifth embodiment, the multilayer thermoplastic sheet according to any of the preceding embodiments, comprising a base layer.

In a sixth embodiment, the multilayer thermoplastic sheet according to any of the preceding embodiments, wherein the color of the first colored layer is different than the color of the second colored layer; and/or the color of the second colored layer is different than the color of the third colored layer.

In a seventh embodiment, the multilayer thermoplastic sheet according to any of the preceding embodiments, wherein the color of the first colored layer is substantially identical to the color of the second colored layer; or the color of the second colored layer is substantially identical to the color of the third colored layer.

In an eighth embodiment, the multilayer thermoplastic sheet according to any of the preceding embodiments, wherein two or more layers comprise an acrylic polymer. In a ninth embodiment, the multilayer thermoplastic sheet according to any of the preceding embodiments, wherein one or more layers comprises a styrenic polymer.

In a tenth embodiment, the multilayer thermoplastic sheet according to any of the preceding embodiments, wherein the total thickness of the multilayer sheet is from about 0.080 inches to about 0.500 inches.

In an eleventh embodiment, the multilayer thermoplastic sheet according to any of the preceding embodiments, wherein the first colored layer has a thickness of from about 7% to about 18% of the sheet total thickness; the second colored layer has a thickness of from about 7% to about 26% of the sheet total thickness; and the third colored layer has a thickness of from about 56% to about 86% of the sheet total thickness.

In a twelfth embodiment, the multilayer thermoplastic sheet according to any of the preceding embodiments, wherein one or more colored layers are white. In a thirteenth embodiment, the multilayer thermoplastic sheet according to any of the preceding embodiments, wherein one or more colored layers are grey. In a fourteenth embodiment, the multilayer thermoplastic sheet according to any of the preceding embodiments, wherein one or more colored layers are black.

In a fifteenth embodiment, the multilayer thermoplastic sheet according to any of the preceding embodiments, wherein the sheet comprises grout lines cut into the sheet extending through the first colored layer and partially into the second colored layer. In a sixteenth embodiment, the multilayer thermoplastic sheet according to any of the preceding embodiments, wherein the sheet comprises grout lines cut into the sheet at a depth from about 0.010 inches to about 0.080 inches.

In a seventeenth embodiment, the multilayer thermoplastic sheet according to any of the preceding embodiments, wherein the sheet comprises grout lines cut into the sheet extending through the first colored layer and partially into the second colored layer, wherein a thickness of the second colored layer remaining in the grout lines is from about 0.002 inches to about 0.018 inches. In an eighteenth embodiment, the multilayer thermoplastic sheet according to any of the preceding embodiments, wherein the sheet comprises grout lines cut into the sheet, wherein a width of the grout lines is from about 0.070 inches to about 0.375 inches.

In a nineteenth embodiment, the multilayer thermoplastic sheet according to any of the preceding embodiments, wherein a width of the sheet is from about 12 inches to about 72 inches; and a length of the sheet is from about 32 inches to about 98 inches.

In a twentieth embodiment, disclosed is a method of preparing a multilayer thermoplastic sheet according to any of the preceding embodiments, the method comprising one or more co-extrusion or co-lamination processes.

In a twenty-first embodiment, disclosed is a method of cutting grout lines into a multilayer thermoplastic sheet according to any of the preceding embodiments, the method comprising computer numerical control (CNC) routing.

Following are another set of embodiments.

In a first embodiment, disclosed is a multilayer thermoplastic sheet, wherein the sheet has a total thickness of from about 0.125 inches to about 0.500 inches, and a plurality of lines cut into the surface at depth of from about 0.010 inches to about 0.080 inches.

In a second embodiment, disclosed is the multilayer thermoplastic composite sheet according to embodiment 1, comprising a first colored thermoplastic layer; and a second colored thermoplastic layer; wherein the plurality of cut lines extend partially into the first colored layer and a thickness of the first colored layer remaining in the lines is from about 0.002 inches to about 0.018 inches.

In a third embodiment, a multilayer thermoplastic sheet according to embodiments 1 or 2, comprising four or more thermoplastic layers. In a fourth embodiment, the multilayer thermoplastic sheet according to any of the preceding embodiments, comprising five or more thermoplastic layers. In a fifth embodiment, the multilayer thermoplastic sheet according to any of the preceding embodiments, comprising a cap layer. In a sixth embodiment, the multilayer thermoplastic sheet according to any of the preceding embodiments, comprising a base layer.

In a seventh embodiment, the multilayer thermoplastic sheet according to any of embodiments 1 to 6, wherein the color of the first colored layer is substantially the same as the color of the second colored layer. In an eighth embodiment, the multilayer thermoplastic sheet according to any of embodiments 1 to 6, wherein the color of the first colored layer is different the color of the second colored layer.

In a ninth embodiment, the multilayer thermoplastic sheet according to any of the preceding embodiments, wherein one or more layers comprise an acrylic polymer. In a tenth embodiment, the multilayer thermoplastic sheet according to any of the preceding embodiments, wherein one or more layers comprises a styrenic polymer.

In an eleventh embodiment, the multilayer thermoplastic sheet according to any of the preceding embodiments, wherein the first colored layer has a thickness of from about 7% to about 26% of the sheet total thickness; and the second colored layer has a thickness of from about 74% to about 93% of the sheet total thickness.

In a twelfth embodiment, the multilayer thermoplastic sheet according to any of the preceding embodiments, wherein one or more colored layers are white. In a thirteenth embodiment, the multilayer thermoplastic sheet according to any of the preceding embodiments, wherein one or more colored layers are grey. In a fourteenth embodiment, the multilayer thermoplastic sheet according to any of the preceding embodiments, wherein one or more colored layers are black.

In a fifteenth embodiment, the multilayer thermoplastic sheet according to any of the preceding embodiments, wherein a width of the cut lines is from about 0.070 inches to about 0.375 inches. In a sixteenth embodiment, the multilayer thermoplastic sheet according to any of the preceding embodiments, wherein a width of the sheet is from about 12 inches to about 72 inches; and a length of the sheet is from about 32 inches to about 98 inches.

In a seventeenth embodiment, disclosed is a method of preparing a multilayer thermoplastic sheet according to any of the preceding embodiments, the method comprising one or more co-extrusion or co-lamination processes.

In an eighteenth embodiment, disclosed is a method of cutting grout lines into a multilayer thermoplastic sheet according to any of the preceding embodiments, the method comprising computer numerical control (CNC) routing.

The articles "a" and "an" herein refer to one or to more than one (e.g. at least one) of the grammatical object. Any ranges cited herein are inclusive.

Measurements described herein, for instance thicknesses or widths, may be a measure at any one point or may represent an average measurement over a series of points. A series of points may be a random sampling of 2, 3, 4, 5 or more at any points.

The term "about" used throughout is used to describe and account for small fluctuations. For instance, "about" may mean the numeric value may be modified by ±0.05%, ±0.1%, ±0.2%, ±0.3%, ±0.4%, ±0.5%, ±1%, ±2%, ±3%, ±4%, ±5%, ±6%, ±7%, ±8%, ±9%, ±10% or more. All numeric values are modified by the term "about" whether or not explicitly indicated. Numeric values modified by the term "about" include the specific identified value. For example "about 5.0" includes 5.0.

The terms "substantially" or "essentially" are similar to "about" in that the defined term may vary from for example by ±0.05%, ±0.1%, ±0.2%, ±0.3%, ±0.4%, ±0.5%, ±1%, ±2%, ±3%, ±4%, ±5%, ±6%, ±7%, ±8%, ±9%, ±10% or more of the definition; for example the term "substantially the same color" may mean the L*a*b* color space values may be "about" the same. The term "generally" may be equivalent to "substantially".

Embodiments of the disclosure include any and all parts and/or portions of the embodiments, claims, description and FIGURES. Embodiments of the disclosure also include any and all combinations of embodiments.

All U.S. patent applications, published patent applications and patents referred to herein are hereby incorporated by reference.

The invention claimed is:

1. A multilayer thermoplastic sheet, comprising
a first colored thermoplastic layer;
a second colored thermoplastic layer; and
a third colored thermoplastic layer,
wherein
the color of the first colored layer is different than the color of the second colored layer;

and/or the color of the second colored layer is different than the color of the third colored layer, the multilayer sheet comprises a plurality of grout lines cut into the sheet extending through the first colored layer and partially into the second colored layer, and the plurality of grout lines are cut into the thermoplastic sheet at a depth from about 0.010 inches to about 0.080 inches.

2. The multilayer thermoplastic sheet according to claim 1, comprising
a cap layer and/or a base layer; and
a clear and/or tinted layer.

3. The multilayer thermoplastic sheet according to claim 1, comprising a layer having a printed pattern.

4. The multilayer thermoplastic sheet according to claim 1, wherein
the color of the first colored layer is identical to the color of the second colored layer; or
the color of the second colored layer is identical to the color of the third colored layer.

5. The multilayer thermoplastic sheet according to claim 1, wherein a total thickness of the multilayer sheet is from about 0.080 inches to about 0.500 inches.

6. The multilayer thermoplastic sheet according to claim 1, wherein the third colored layer comprises acrylonitrile-butadiene-styrene copolymer, and the first colored layer and the second colored layer comprise polymethylmethacrylate.

7. The multilayer thermoplastic sheet according to claim 1, wherein a thickness of the second colored layer remaining in the grout lines is from about 0.002 inches to about 0.018 inches.

8. The multilayer thermoplastic sheet according to claim 1, wherein a width of the grout lines is from about 0.070 inches to about 0.375 inches.

9. The multilayer thermoplastic sheet according to claim 1, wherein
the first colored layer has a thickness of from about 7% to about 18% of a total sheet thickness;
the second colored layer has a thickness of from about 7% to about 26% of a total sheet thickness; and
the third colored layer has a thickness of from about 56% to about 86% of a total sheet thickness.

10. The multilayer thermoplastic sheet according to claim 1, wherein one or more colored layers are white, grey, or black.

11. A method of preparing a multilayer thermoplastic sheet according to claim 1, the method comprising one or more co-extrusion or co-lamination processes, and comprising computer numerical control (CNC) routing.

12. A multilayer thermoplastic sheet, comprising
a first colored thermoplastic layer; and
a second colored thermoplastic layer,
wherein
the sheet has a total thickness of from about 0.125 inches to about 0.500 inches, a plurality of lines cut into the surface at depth of from about 0.010 inches to about 0.080 inches,
the plurality of cut lines extend partially into the first colored layer and a thickness of the first colored layer remaining in the lines is from about 0.002 inches to about 0.018 inches, and
a width of the cut lines is from about 0.070 inches to about 0.375 inches.

13. The multilayer thermoplastic sheet according to claim 12, comprising
a cap layer and/or a base layer; and
a clear and/or tinted layer.

14. The multilayer thermoplastic sheet according to claim 12, comprising a layer having a printed pattern.

15. The multilayer thermoplastic sheet according to claim 12, wherein the color of the first colored layer is identical to the color of the second colored layer.

16. The multilayer thermoplastic sheet according to claim 12, wherein the color of the first colored layer is different than the color of the second colored layer.

17. The multilayer thermoplastic sheet according to claim 12, wherein
the first colored layer has a thickness of from about 7% to about 26% of the sheet total thickness; and
the second colored layer has a thickness of from about 74% to about 93% of the sheet total thickness.

18. The multilayer thermoplastic sheet according to claim 12, wherein one or more colored layers are white, grey, or black.

19. The multilayer thermoplastic sheet according to claim 12, wherein the first colored layer and the second colored layer comprise polymethylmethacrylate.

20. A method of preparing a multilayer thermoplastic sheet according to claim 12, the method comprising one or more co-extrusion or co-lamination processes, and computer numerical control (CNC) routing.

* * * * *